(12) United States Patent
Brown et al.

(10) Patent No.: US 7,277,396 B2
(45) Date of Patent: Oct. 2, 2007

(54) PROCESSOR WITH SCRIPT-BASED PERFORMANCE MONITORING

(75) Inventors: David Allen Brown, Austin, TX (US); Robert A. Corley, Cedar Park, TX (US); Asif Q. Khan, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 853 days.

(21) Appl. No.: 10/699,037

(22) Filed: Oct. 31, 2003

(65) Prior Publication Data

US 2005/0094565 A1    May 5, 2005

(51) Int. Cl.
*H04L 12/28* (2006.01)
*H04L 1/00* (2006.01)

(52) U.S. Cl. .................... 370/241; 370/395.1

(58) Field of Classification Search ............. 370/236.2, 370/241, 235, 236, 230.1, 395.1, 241.1; 709/223, 709/245, 238
See application file for complete search history.

(56) References Cited

U.S. PATENT DOCUMENTS

| 7,197,008 B1 * | 3/2007 | Shabtay et al. ............. 370/218 |
| 2005/0086392 A1 * | 4/2005 | Corley ......................... 710/1 |

OTHER PUBLICATIONS

U.S. Appl. No. 10/029,703, filed Dec. 21, 2001, Baker et al., "Processor with Multiple-Pass Non-Sequential Packet Classification Feature."

* cited by examiner

*Primary Examiner*—Firmin Backer
*Assistant Examiner*—Farah Faroul

(57) ABSTRACT

A processor includes controller circuitry operative to control performance monitoring for at least one flow of cells or other protocol data units received by the processor. The controller circuitry includes a classifier and is operative to access memory circuitry associated with the processor. The classifier is configured to perform at least a first pass classification of at least a subset of the protocol data units. The controller circuitry in conjunction with a first pass classification of a protocol data unit of a first type is operative to execute a first script, and in conjunction with a first pass classification of a protocol data unit of a second type is operative to execute a second script different than the first script. A result of execution of at least one of the first and second scripts is stored in the memory circuitry. A performance monitoring output is generated, responsive to receipt of the protocol data unit of the second type, based at least in part on the result of execution of at least one of the first and second scripts. The performance monitoring output may be generated in conjunction with a second pass classification of the protocol data unit of the second type, upon execution of an additional function or other type of script.

23 Claims, 4 Drawing Sheets

PROCESSOR WITH SCRIPT-BASED PERFORMANCE MONITORING

FIELD OF THE INVENTION

The present invention relates generally to data communication devices and systems, and more particularly to network processors or other types of processors utilizable in conjunction with processing operations, such as routing or switching, performed on packets or other protocol data units (PDUs).

BACKGROUND OF THE INVENTION

A network processor generally controls the flow of packets between a physical transmission medium, such as a physical layer portion of, e.g., an asynchronous transfer mode (ATM) network or synchronous optical network (SONET), and a switch fabric in a router or other type of packet switch. Such routers and switches generally include multiple network processors, e.g., arranged in the form of an array of line or port cards with one or more of the processors associated with each of the cards.

Certain network processors may be configured to support the processing of a variety of different types of data traffic, such as ATM cells, Internet Protocol (IP) packets, as well as other types of packet-based traffic. The ATM traffic is typically in the form of fixed-length 53-byte cells, each including a 5-byte header and a 48-byte payload, while the IP traffic generally comprises variable-length packets. ATM cells and IP packets may be viewed as examples of what are more generally referred to herein as PDUs.

Operation, administration and maintenance (OAM) functions within the network processor may be provided in accordance with an established protocol, such as ITU-T Recommendation I.610, "B-ISDN Operation and Maintenance Principles and Functions," February 1999, which is incorporated by reference herein.

One type of OAM function relates to performance monitoring (PM). OAM performance monitoring in the ATM context generally involves in-service monitoring of cell traffic on an ATM connection to detect errors and to collect statistical information regarding network reliability. OAM performance monitoring is initiated and released by respective activation and deactivation sequences. Once initiated, one or more OAM forward performance monitoring (FPM) cells are inserted into a stream of user cells on a given connection. The network processor which receives an FPM cell must calculate errors and statistics for a corresponding block of user cells. Results are sent back to the originator of the OAM PM flow as a backwards reporting (BR) cell.

A problem that arises in utilizing OAM performance monitoring in a network processor is that such monitoring is difficult to implement in a manner that provides sufficient flexibility for statistical calculation without degrading overall system performance. Typical conventional approaches involve implementing OAM performance monitoring either entirely in the form of one or more hardware state machines, or entirely in software executed by a host processor associated with the network processor.

The hardware state machine approach is fast but not very flexible. For example, it fails to provide a sufficient level of programmability regarding the particular statistics to be collected, and usually offloads the statistics to a host processor for later collection.

The host processor software approach is very flexible, but may adversely impact overall system performance since the software must update all the statistics and then generate the appropriate BR cells.

It is therefore apparent that a need exists for an improved technique for implementing OAM performance monitoring in a network processor.

SUMMARY OF THE INVENTION

The invention provides improved performance monitoring for processing received cells, packets or other PDUs in a network processor or other type of processor, in a manner that avoids the difficulties associated with the conventional approaches described above.

In accordance with one aspect of the invention, a network processor or other type of processor includes controller circuitry operative to control performance monitoring for a particular flow of PDUs received by the processor. The controller circuitry includes a classifier and is operative to access memory circuitry associated with the processor. The classifier is configured to perform at least a first pass classification of at least a subset of the PDUs. The controller circuitry in conjunction with a first pass classification of a PDU of a first type is operative to execute a first script, and in conjunction with a first pass classification of a PDU of a second type is operative to execute a second script different than the first script. The PDUs of the first and second types may comprise, by way of example, ATM user cells and OAM FPM cells, respectively. A result of execution of at least one of the first and second scripts is stored in the memory circuitry. A performance monitoring output is generated, responsive to receipt of the protocol data unit of the second type, based at least in part on the result of execution of at least one of the first and second scripts.

The performance monitoring output may be generated in conjunction with a second pass classification of the PDU of the second type, upon execution of an additional function or other type of script. This additional execution may cause the retrieval of a result of execution of the second script from the memory circuitry, with the performance monitoring output being generated based at least in part on the result of execution of the second script.

The controller circuitry may comprise, in addition to the classifier, a compute engine for executing one or more of the scripts, and a traffic manager for generating the performance monitoring output. The compute engine may be implemented as a portion of a state engine of the processor, or using other suitable arrangements of hardware, software or firmware.

In the illustrative embodiment, the performance monitoring output comprises one or more backwards reporting (BR) cells generated in a manner compliant with OAM performance monitoring as specified in the above-cited I.610 protocol.

The processor may be configured as a network processor integrated circuit to provide an interface between a network and a switch fabric in a router or switch.

Advantageously, the techniques of the invention in the illustrative embodiment process received PDUs in a manner that provides a high degree of flexibility in terms of statistics collection without undermining system performance.

DETAILED DESCRIPTION OF THE INVENTION

The invention will be illustrated herein in conjunction with an exemplary information processing system which includes a network processor configured in a particular manner. It should be understood, however, that the invention is more generally applicable to any processor in which it is desirable to provide more efficient performance monitoring than is possible using the conventional techniques described above.

A "processor" as the term is used herein may be implemented, by way of example and without limitation, utilizing a microprocessor, central processing unit (CPU), digital signal processor (DSP), application-specific integrated circuit (ASIC), or other type of data processing device, as well as portions or combinations of these and other devices.

The term "controller circuitry" as used herein is intended to include any portion of a processor or other type of logic or processing circuitry which is capable of performing or otherwise controlling at least a portion of an operation associated with performance monitoring in the processor.

The term "memory circuitry" as used herein is intended to include a separate memory as well as a particular portion of a larger memory, and may refer to internal memory, external memory or combinations thereof.

The terms "protocol data unit" and "PDU" as used herein are intended to include a cell, a packet, or other identifiable grouping of information.

The present invention in an illustrative embodiment is configured such that a network processor includes controller circuitry configurable to control processing operations associated with performance monitoring for one or more flows received by the network processor. The processing operations are preferably implemented as script-based operations within a compute engine of the controller circuitry.

Figure 1:
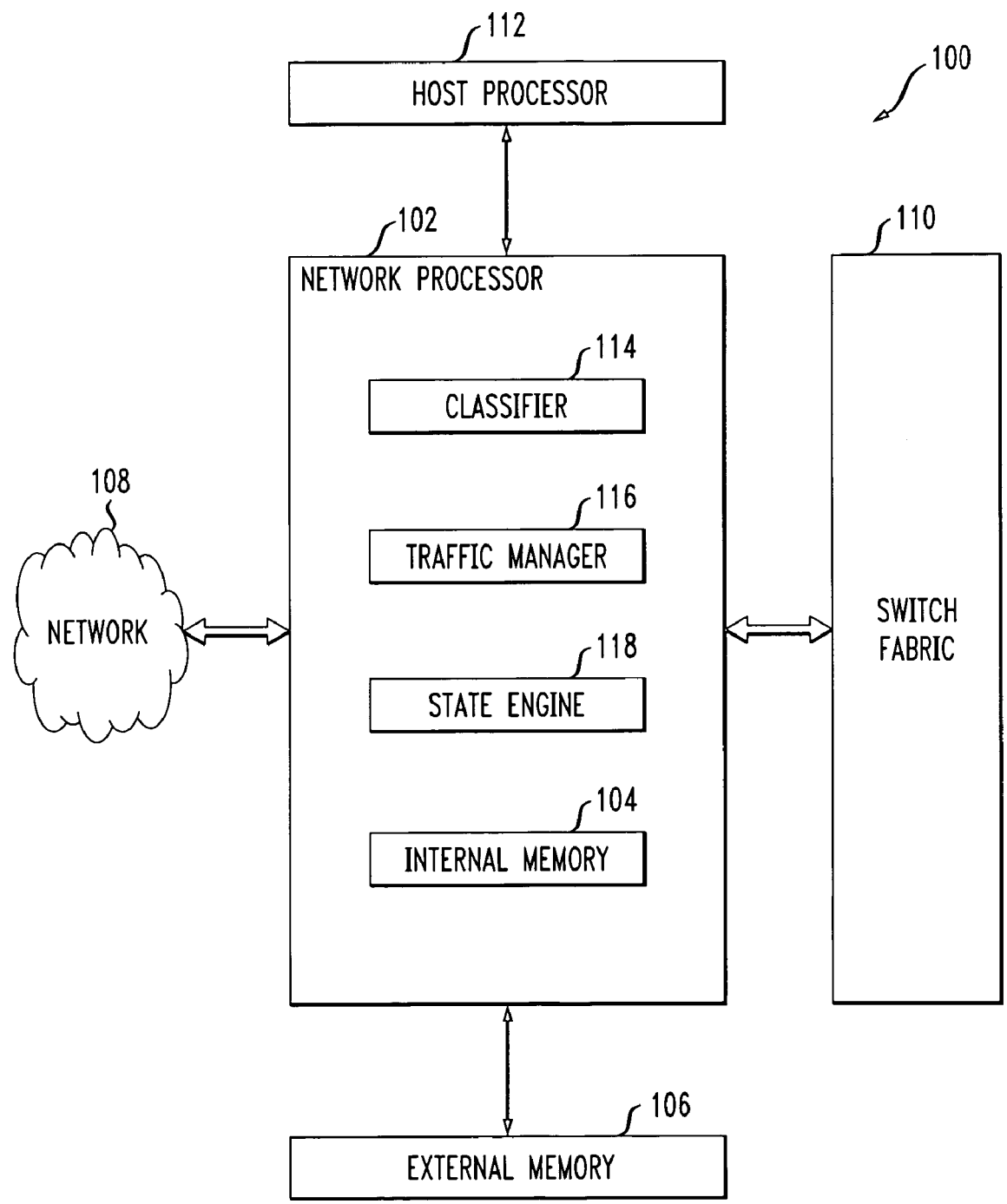
FIG. 1 is a simplified block diagram of an information processing system in which the present invention is implemented.

FIG. 1 shows an information processing system 100 in which the invention is implemented. The system 100 includes a network processor 102 having an internal memory 104. The network processor 102 is coupled to an external memory 106 as shown, and is configured to provide an interface between a network 108 from which PDUs are received and a switch fabric 110 which controls switching of PDU data. The processor 102 and its associated external memory 106 may be implemented, e.g., as one or more integrated circuits installed on a line card or port card of a router or switch. In such a configuration, the switch fabric 110 is generally considered to be a part of the router or switch.

One or both of the internal and external memories 104, 106 may be utilized to implement otherwise conventional network processor memory elements such as PDU buffer memory, queuing and dispatch buffer memory, etc.

Also coupled to the network processor 102 is an associated host processor 112. The host processor 112 may be configured to communicate with the network processor 102 over a standard bus architecture, e.g., a peripheral component interconnect (PCI) bus.

In accordance with an aspect of the invention, the network processor 102 includes controller circuitry comprising a classifier 114, a traffic manager 116 and a state engine 118. These elements are configured to perform operations associated with performance monitoring, as will be described in greater detail in conjunction with FIGS. 2 and 3 below. It should be appreciated, however, that this particular arrangement of controller circuitry elements is by way of illustrative example only, and other types and arrangements of elements may be used in alternative embodiments of the invention.

The classifier 114 is preferably configured to perform a two-pass classification or other type of multiple-pass classification of PDUs received by the network processor 102. Examples of multiple-pass classification techniques suitable for use with the present invention may be found in U.S. patent application Ser. No. 10/029,703, filed Dec. 21, 2001 and entitled "Processor with Multiple-Pass Non-Sequential Packet Classification Feature," which is commonly assigned herewith and incorporated by reference herein. However, the invention does not require the use of multiple-pass classification. The term "first pass classification" as used herein is therefore intended to include not only a first pass of a multiple-pass classification, but also the only pass of a single-pass classification.

It will be assumed without limitation that, in the illustrative embodiment, the performance monitoring functionality of the network processor 102 may be provided in a manner that conforms to an established protocol, such as the above-noted ITU-T Recommendation I.610 for OAM functions. However, the invention does not require the use of this particular protocol, or any other standard protocol, and can be configured using non-standard OAM techniques as well as combinations of standard and non-standard OAM techniques.

The particular arrangement of system elements shown in FIG. 1 is by way of illustrative example only. More particularly, as previously noted, the invention can be implemented in any type of processor, and is not limited to any particular PDU processing application. Also, the system 100 and network processor 102 as illustrated in FIG. 1 are considerably simplified for clarity of discussion, and may include other elements in addition to or in place of those specifically shown, including one or more elements of a type commonly found in a conventional implementation of such a system and network processor. For example, the network processor may include queuing and dispatch logic, one or more memory controllers, interface circuitry for interfacing the network processor with the network 108, the switch fabric 110, the host processor 112 and other external devices, as well as other conventional elements not explicitly shown in the figure. These conventional elements, being well-understood by those skilled in the art, are not described in detail herein.

The performance monitoring functionality of the network processor 102 as described herein may be implemented at least in part in the form of software program code. For example, the controller circuitry comprising classifier 114, traffic manager 116 and state engine 118 may be implemented at least in part utilizing elements that are programmable via instructions or other software that may be supplied to the network processor 102 via the host processor 112 or other suitable mechanism.

Figure 2:
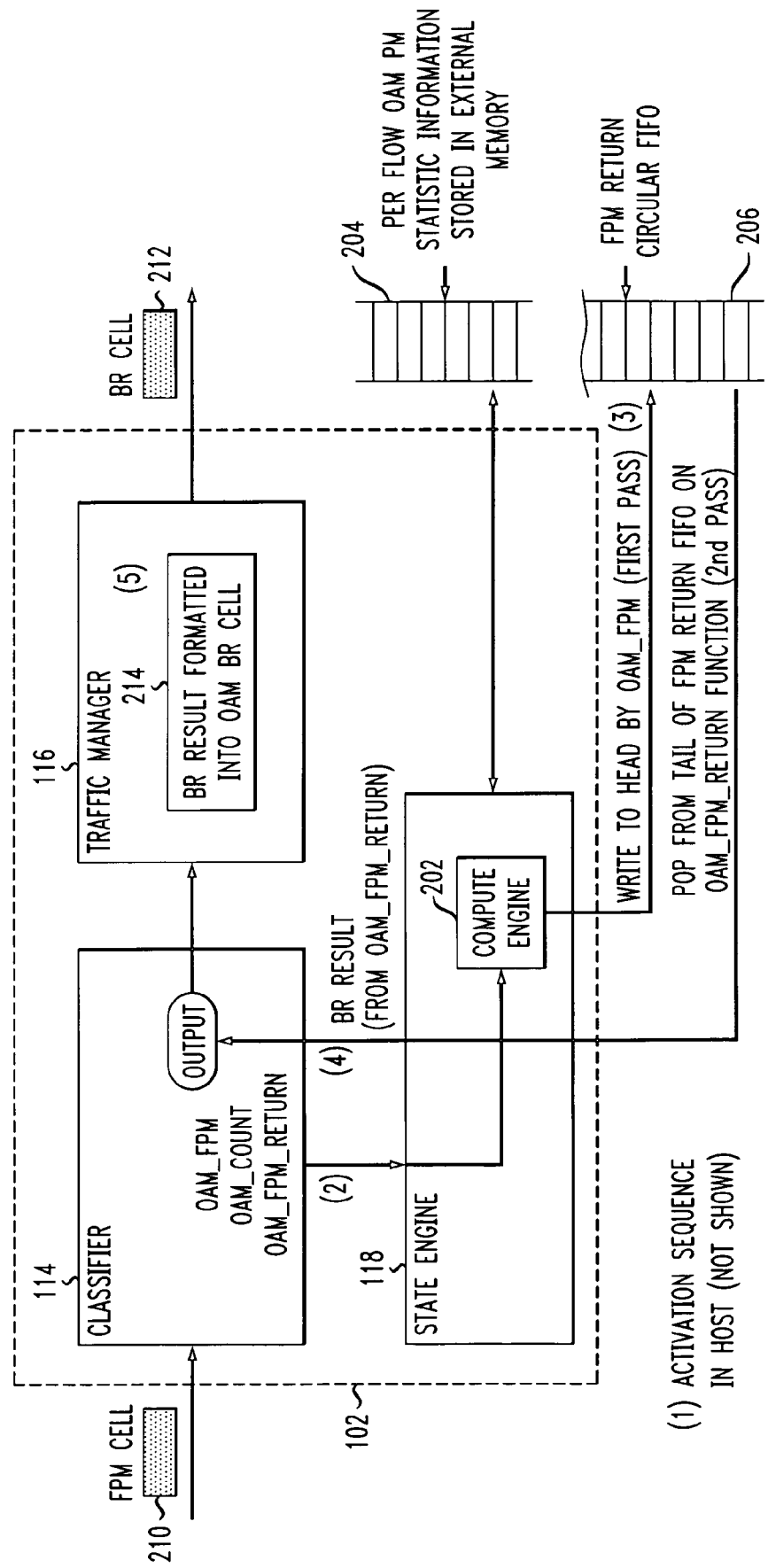
FIG. 2 shows a more detailed view of a portion of the FIG. 1 system illustrating the implementation of performance monitoring therein in accordance with the invention.

FIG. 2 shows a more detailed view of a portion 200 of the system 100, illustrating the operation of the classifier 114, traffic manager 116 and state engine 118 of the network processor 102 in providing performance monitoring functionality within the system 100. It should be noted that the elements 114, 116 and 118 may perform other operations within the network processor, of a type conventionally performed by such elements but not otherwise associated with the performance monitoring operations illustrated in FIG. 2, and that these other operations may be implemented in a manner known to those skilled in the art.

The classifier 114 in the illustrative embodiment will be assumed to be a two-pass classifier, as was previously indicated, although other types of classifiers can be used.

The state engine 118 as implemented in the network processor 102 includes a compute engine 202. The compute engine controls the storage of per-flow OAM performance monitoring statistic information in a storage element 204, and also accesses an FPM return circular first-in-first-out (FIFO) storage element 206. The storage elements 204, 206 are preferably implemented as portions of the external memory 106, but one or both may be implemented as portions of the internal memory 104, or using combinations of internal and external memory.

Although the compute engine 202 is shown in FIG. 2 as being implemented as a portion of a state engine of the network processor 102, other suitable arrangements of one or more of hardware, software and firmware may be utilized in implementing the compute engine. Also, other types of execution mechanisms suitable for executing scripts may be used in conjunction with or in place of compute engine 202.

The performance monitoring functionality of the network processor 102 as illustrated in FIG. 2 generally includes operations denoted as steps (1) through (5) in the figure.

Certain of these steps involve the use of functions, such as functions denoted herein as OAM_COUNT, OAM_FPM and OAM_FPM_RETURN, which are executable by the compute engine 202 or otherwise executable by the network processor 102. Such functions are examples of what are more generally referred to herein as "scripts." The term "script" as used herein is intended to include without limitation any function or other type of program code executable in a network processor or other type of processor.

Step (1), which is not explicitly shown in FIG. 2, involves activation of the performance monitoring functionality of the network processor 102 for a given PDU flow or set of PDU flows. This activation may be controlled via activation sequence software running on the host processor 112. The activation process in the illustrative embodiment may specify particular processing scripts for use by the compute engine, the number of user cells between FPM cells, and other information. A PDU flow for which OAM performance monitoring has been activated is also referred to herein as an OAM flow or an OAM PM flow. The term "user cell" in this context is intended to include any type of cell other than an FPM cell.

In operation, user cells and FPM cells are received on a given OAM PM flow by the classifier 114, and in a first pass of the classifier corresponding functions OAM_COUNT and OAM_FPM are called for each of the respective user cells and FPM cells. More specifically, each user cell of the OAM flow when received in the classifier results in a call of the OAM_COUNT function in conjunction with first pass classification of that user cell, and each FPM cell of the OAM flow when received in the classifier results in a call of the OAM_FPM function in conjunction with first pass classification of that FPM cell.

The OAM_COUNT function may be configured, by way of example, to count the number of cells, accumulate parity over a block of user cells, and store the information back to memory.

The OAM_FPM function may be configured, by way of example, to take data from an FPM cell and results generated by the OAM_COUNT function calls, and to calculate a corresponding BR result. The BR result may indicate how many user cells were received and if any errors occurred, and may also be used to generate other statistics.

It should be noted that these and other functions described herein are merely examples of processing scripts that may be used in implementing the invention. A wide variety of other scripts may be used, as will be appreciated by those skilled in the art.

The above-noted function calls are passed from the classifier to the compute engine of the state engine. This portion of the process corresponds generally to Step (2) in the figure. The figure also shows a single FPM cell 210 arriving at an input of the classifier.

As noted previously herein, FPM cells are interspersed with user cells in OAM performance monitoring, and receipt of an FPM cell triggers the calculation of errors and statistics for a corresponding block of user cells. Results are sent back along the connection as a backwards reporting (BR) cell.

The compute engine 202 upon receipt of the OAM_FPM function call associated with a given FPM cell executes the function, which calculates errors and statistics over the appropriate block of user cells and then writes a BR result to the head of the circular FIFO 206. The per-flow OAM PM statistic information is written to the storage element 204. This portion of the performance monitoring process is indicated generally as Step (3) in the figure.

Second pass classification of the given FPM cell in the classifier 114 results in a call of an OAM_FPM_RETURN function. Execution of the function causes the BR result to be retrieved or "popped" from the tail of the circular FIFO 206, and returned to the classifier 114 for delivery to the traffic manager 116 along with the FPM cell. This portion of the process corresponds generally to Step (4) in the figure.

The OAM_FPM_RETURN function in the illustrative embodiment is implemented as a function that is not executed by the compute engine 202, but is instead executed elsewhere in the network processor 102. In other embodiments, the OAM_FPM_RETURN function could be implemented as a function or other type of script executed by the compute engine.

The traffic manager receives the FPM cell and the BR result and formats a corresponding BR cell 212, which may be delivered to the switch fabric 110, for example, so that it may be delivered back to the originator of the OAM PM flow. This portion of the process corresponds generally to Step (5) in the figure.

Figure 3:
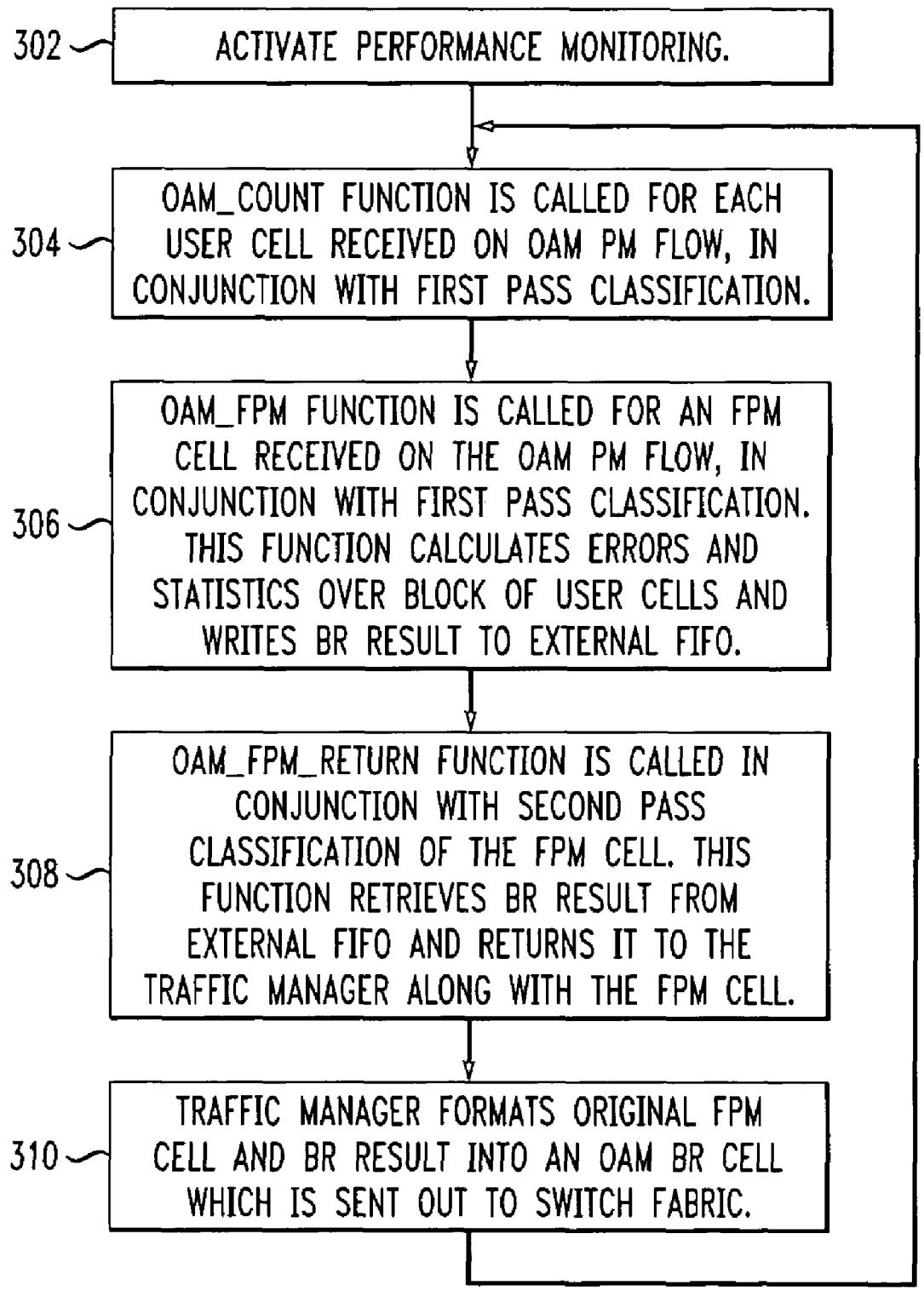
FIG. 3 is a flow diagram of performance monitoring operations implemented in the FIG. 1 system in accordance with the techniques of the invention.

FIG. 3 is a flow diagram 300 which summarizes the processing operations associated with performance monitoring in the network processor 102 in the illustrative embodiment of the invention. Again, the performance monitoring is assumed to be implemented in a manner compliant with the above-cited I.610 OAM protocol.

In step 302, the performance monitoring functionality is activated.

In step 304, the OAM_COUNT function is called for each user cell received on a given OAM PM flow, in conjunction with first pass classification of the user cell in the classifier 114.

In step 306, the OAM_FPM function is called for an FPM cell received on the OAM PM flow, in conjunction with first pass classification of the FPM cell in the classifier 114. As noted above, this function calculates errors and statistics over a block of user cells and writes a BR result to circular FIFO 206, preferably in external memory 106.

In step 308, the OAM_FPM_RETURN function is called in conjunction with second pass classification of the FPM cell in the classifier 114. As noted above, this function when executed retrieves the BR result from the circular FIFO 206. The BR result is returned to the traffic manager 116 along with the FPM cell, via the classifier 114.

In step 310, the traffic manager formats the original FPM cell and the BR result into an OAM BR cell which may be transmitted to the switch fabric 110.

The particular steps shown in FIG. 3 should be considered as examples of performance monitoring processing operations in accordance with the illustrative embodiment of FIGS. 1 and 2, rather than as limiting the scope of the invention in any way. For example, it is possible to implement the invention utilizing more scripts or fewer scripts than the particular number used in FIGS. 2 and 3.

An advantage of the performance monitoring implementation in the illustrative embodiment described above is that it provides improved flexibility in the statistics collected for a given OAM PM flow. Since the OAM statistics and BR cell information are calculated on the first pass of ATM cell processing, where ATM cells are typically reassembled into larger PDUs, the BR result can be written into a FIFO that can be read later while the reassembled PDU is "replayed" to the traffic manager.

This decoupling of first pass and second pass processing in the illustrative embodiment decreases the system performance impact of generating OAM BR cells, while also providing enhanced flexibility in performance monitoring. For example, the invention can provide full programmability of the particular OAM statistics to be collected, while also ensuring that the network processor experiences no significant degradation in performance when OAM performance monitoring is running with normal traffic.

The network processor 102 may be configured as an integrated circuit to provide an interface between a network and a switch fabric in a router or switch.

Figure 4:
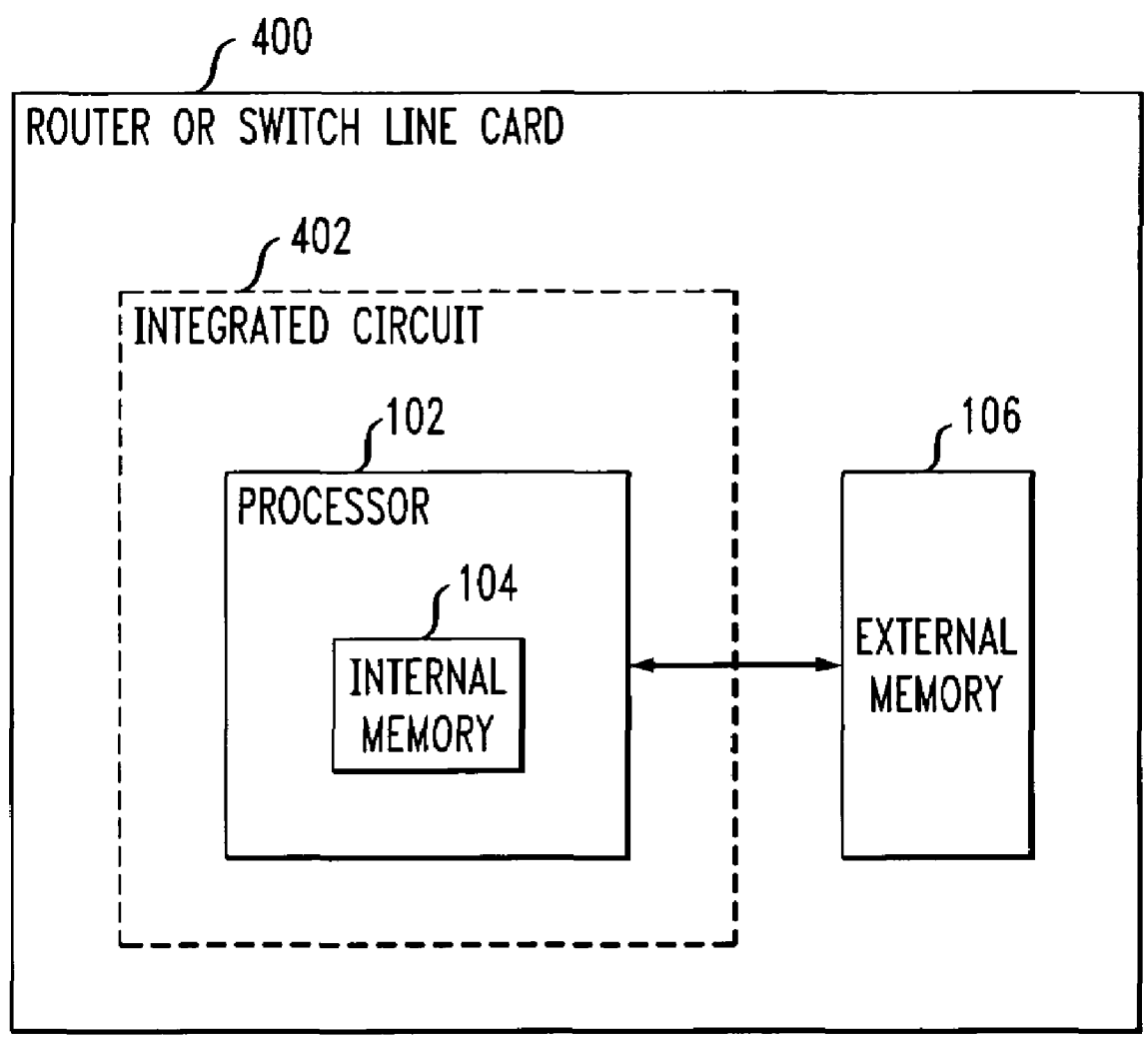
FIG. 4 illustrates one possible implementation of a network processor of the FIG. 1 system as an integrated circuit installed on a line card of a router or switch.

FIG. 4 illustrates an example router or switch line card embodiment of a portion of the system 100 of FIG. 1. In this embodiment, the processing system comprises a line card 400 having at least one integrated circuit 402 installed thereon. The integrated circuit 402 comprises network processor 102 which has internal memory 104. The network processor 102 interacts with external memory 106 on the line card 400. The host processor 112 may also be installed on the line card 400, although it is not shown in the figure.

The portion of the processing system as shown in FIG. 4 is considerably simplified for clarity of illustration. It is to be appreciated, however, that the processing system may comprise a router or switch which includes multiple such line cards, and that each of the line cards may include multiple integrated circuits. A similar embodiment may be implemented in the form of a port card in a router or switch.

The above-described embodiments of the invention are intended to be illustrative only. For example, although the illustrative embodiment of FIG. 1 utilizes classifier 114, traffic manager 116 and state engine 118 in implementing processing operations associated with performance monitoring, other embodiments may utilize different types of controller circuitry for implementing such operations. In addition, other embodiments can use different types of functions or other scripts, and other execution mechanisms, for implementing the described functionality. A performance monitoring output may be generated based on a result of execution of a single script or results of execution of multiple scripts. Also, the invention does not require the use of any particular performance monitoring protocol or results reporting format. These and numerous other alternative embodiments within the scope of the following claims will be readily apparent to those skilled in the art.

What is claimed is:

1. A processor comprising:
controller circuitry operative to control performance monitoring for at least one flow of protocol data units received by the processor;
the controller circuitry comprising a classifier and being operative to access memory circuitry associated with the processor;
wherein the classifier is configured to perform at least a first pass classification of at least a subset of the protocol data units;
the controller circuitry in conjunction with a first pass classification of a protocol data unit of a first type being operative to execute a first script, and in conjunction with a first pass classification of a protocol data unit of a second type being operative to execute a second script different than the first script, a result of execution of at least one of the first and second scripts being storable in the memory circuitry;
wherein a performance monitoring output is generated, responsive to receipt of the protocol data unit of the second type, based at least in part of the result of execution of at least one of the first and second scripts.

2. The processor of claim 1 wherein the performance monitoring output is generated in conjunction with a second pass classification of the protocol data unit of the second type.

3. The processor of claim 1 wherein in conjunction with a second pass classification of the protocol data unit of the second type, the controller circuitry is further operative to execute a function or other type of script, this additional execution causing the retrieval of a result of execution of the second script from the memory circuitry, the performance monitoring output being generated based at least in part on the result of execution of the second script.

4. The processor of claim 1 wherein the controller circuitry further comprises a compute engine and a traffic manager, the compute engine being operative to execute the first and second scripts, and the traffic manager being operative to generate the performance monitoring output based at least in part on the results of execution of the first and second scripts.

5. The processor of claim 1 wherein the protocol data unit of the first type comprises a user protocol data unit, and the protocol data unit of the second type comprises a forward performance monitoring (FPM) protocol data unit.

6. The processor of claim 1 wherein the performance monitoring output comprises a backward reporting protocol data unit.

7. The processor of claim 1 wherein at least one of the protocol data units comprises an asynchronous transfer mode (ATM) cell.

8. The processor of claim 1 wherein the performance monitoring is performed in a manner compliant with an I.610 protocol.

9. The processor of claim 1 wherein the first script when executed causes the controller circuitry to increment a count of a plurality of protocol data units of the first type.

10. The processor of claim 1 wherein the first script when executed causes the controller circuitry to generate accumulated parity information over a plurality of protocol data units of the first type.

11. The processor of claim 1 wherein the second script when executed causes the controller circuitry to calculate a backwards reporting result based at least in part on a result of execution in the first script.

12. The processor of claim 11 wherein the backwards reporting result is storable in a circular first-in first-out portion of the memory circuitry.

13. The processor of claim 12 wherein in conjunction with a second pass classification of the protocol data unit of the second type, the controller circuitry is further operative to execute an additional function or other type of script, the additional execution causing the retrieval of the backwards reporting result from the circular first-in first-out portion of the memory circuitry.

14. The processor of claim 13 wherein the performance monitoring output is generated utilizing the protocol data unit of the second type and the retrieved backwards reporting result.

15. The processor of claim 11 wherein the backwards reporting results indicates how many protocol data units of the first type has been received, up to the time of receipt of a protocol data unit of the second type, since receipt of a previous protocol data unit of the second type.

16. The processor of claim 11 wherein the backwards reporting result indicates if any errors are present in the protocol data units of the first type.

17. The processor of claim 11 wherein the backwards reporting result is utilized to compute statistics for the flow, the statistics being storable on a per-flow basis in a portion of the memory circuitry.

18. The processor of claim 1 wherein the memory circuitry comprises an external memory of the processor.

19. The processor of claim 1 wherein the processor is configured to provide an interface for communication of the received protocol data units between a network and a switch fabric.

20. The processor of claim 1 wherein the processor comprises a network processor.

21. The processor of claim 1 wherein the processor is configured as an integrated circuit.

22. A method for use in a processor comprising controller circuitry operative to control performance monitoring for at least one flow of protocol data units received by the processor, the controller circuitry comprising a classifier and being operative to access memory circuitry associated with the processor, wherein the classifier is configured to perform at least a first pass classification of at least a subset of the protocol data units, the method comprising the steps of:
 executing a first script in conjunction with a first pass classification of a protocol data unit of a first type;
 executing a second script different than the first script in conjunction with a first pass classification of a protocol data unit of a second type;
 storing a result of execution of at least one of the first and second scripts in the memory circuitry; and
 generating a performance monitoring output, responsive to receipt of the protocol data unit of the second type, based at least in part on the result of execution of at least one of the first and second scripts.

23. An article of manufacture comprising a computer-readable storage medium having program code stored thereon for use in a processor comprising controller circuitry operative to control performance monitoring for at least one flow of protocol data units received by the processor, the controller circuitry comprising a classifier and being operative to access memory circuitry associated with the processor, wherein the classifier is configured to perform at least a first pass classification of at least a subset of the protocol data units, the program when executed in the processor implemented the steps of:
 executing a first script in conjunction with a first pass classification of a protocol data unit of a first type;
 executing a second script different than the first script in conjunction with a first pass classification of a protocol data unit of a second type;
 storing a result of execution of at least one of the first and second scripts in the memory circuitry; and
 generating a performance monitoring output, responsive to receipt of the protocol data unit of the second type, based at least in part on the result of execution of at least one of the first and second scripts.

* * * * *